(12) United States Patent
Matsumoto et al.

(10) Patent No.: US 6,304,305 B1
(45) Date of Patent: *Oct. 16, 2001

(54) ACTIVE MATRIX LIQUID CRYSTAL DISPLAY

(75) Inventors: Seiichi Matsumoto; Susumu Ohi, both of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,727

(22) Filed: Oct. 20, 1998

(30) Foreign Application Priority Data

Oct. 20, 1997 (JP) .................................................. 9-286892

(51) Int. Cl.[7] ............................ G02F 1/1333; G09G 3/36
(52) U.S. Cl. ................................................. 349/40; 345/87
(58) Field of Search ............................. 349/40, 139, 143, 349/54; 345/87

(56) References Cited

U.S. PATENT DOCUMENTS

| | | | |
|---|---|---|---|
| 4,532,506 | * 7/1985 | Kitazima et al. | 340/784 |
| 5,313,319 | * 5/1994 | Salisbury | 349/40 |
| 5,606,340 | * 2/1997 | Suzuki et al. | 345/87 |
| 5,657,139 | * 8/1997 | Hayashi | 349/40 |
| 5,852,480 | * 12/1998 | Yajima et al. | 349/40 |
| 5,907,314 | * 5/1999 | Negishi et al. | 345/103 |
| 5,953,086 | * 9/1999 | Oogiichi et al. | 349/40 |
| 5,973,658 | * 10/1999 | Kim et al. | 349/40 |

FOREIGN PATENT DOCUMENTS

| | | |
|---|---|---|
| 63-10558 | 1/1988 | (JP) . |
| 63-220289 | 9/1988 | (JP) . |
| 6-186592 | 7/1994 | (JP) . |
| 07-175075 | 7/1995 | (JP) . |

* cited by examiner

*Primary Examiner*—William L. Sikes
*Assistant Examiner*—Dung Nguyen
(74) *Attorney, Agent, or Firm*—Sughrue, Mion, Zinn, Macpeak & Seas, PLLC

(57) ABSTRACT

An active matrix liquid crystal display has a thin film transistor array which includes scanning lines, signal lines, pixel electrodes, and display thin film transistors. This active matrix liquid crystal display includes, around the image region of the thin film transistor array, a scanning line reference potential line, surge protecting circuits for connecting the scanning lines with the scanning line reference potential line, a signal line reference potential line, and surge protecting circuits for connecting the signal lines with the signal line reference potential line. When a surge voltage is applied to the scanning line or signal line, electric charge is let go to the scanning line reference potential line or signal line reference potential line, respectively. Arbitrary reference potentials can be applied to the scanning line reference potential line and signal line reference potential line. The surge protecting circuit includes two two-terminal thin film transistors.

1 Claim, 7 Drawing Sheets

ACTIVE MATRIX LIQUID CRYSTAL DISPLAY

BACKGROUND OF THE INVENTION

1. Field of the Invention

The present invention relates to a liquid crystal display and, more particularly, to an active matrix liquid crystal display.

2. Description of the Prior Art

Presently, liquid crystal displays are extensively used as light and low-power-consuming displays in personal computers and various monitors. In particular, active matrix liquid crystal displays in which a thin film transistor is formed in each pixel are used as high-resolution displays in various applications, because the brightness of each pixel can be finely changed by voltage control.

The structure and operating principle of a conventional general active matrix liquid crystal display (to be referred to as an active matrix display hereinafter) will be described below with reference to FIGS. 1 and 2. FIG. 1 is a sectional view showing this conventional active matrix display. FIG. 2 shows an outline of the circuit configuration of a thin film transistor array formed in a matrix on a first insulating substrate shown in FIG. 1.

In the conventional active matrix display as shown in FIG. 1, first and second insulating substrates 1 and 2 are opposed parallel to each other, and a liquid crystal 10 as a display material is sandwiched between these substrates. A thin film transistor array (FIG. 2) including pixel electrodes 6 is formed on one principal surface of the first insulating substrate 1, which is in contact with the liquid crystal 10.

On one principal surface of the second insulating substrate 2, which is opposed to the first insulating substrate 1 and in contact with the liquid crystal 10, color layers 7, 8, and 9 of three primary colors R (Red), G (Green), and B (Blue) are formed in portions corresponding to the pixel electrodes 6 of the first substrate. A black matrix 11 for intercepting light is formed in the boundaries between these color layers 7, 8, and 9. A common electrode 12 made of a transparent conductive film is formed on the black matrix 11.

FIG. 2 shows an outline of the circuit configuration of the thin film transistor array formed in a matrix on the first insulating substrate shown in FIG. 1. On the principal surface of the first insulating substrate 1, which is in contact with the liquid crystal 10, scanning lines 3 and signal lines 4 are formed in the row and column directions, respectively. Display thin film transistors 5 are formed at the intersections of these scan and signal lines 3 and 4. The gate, drain, and source of each display thin film transistor 5 are connected to the scanning line 3, the signal line 4, and the pixel electrode 6 made of a transparent conductive film, respectively.

In the active matrix display with the above arrangement, a scan pulse voltage for turning on the display thin film transistors 5 is supplied to each scanning line 3. In synchronism with this scan pulse, a signal voltage corresponding to an image to be displayed is supplied to the signal lines 4. Accordingly, the display thin film transistors 5 connected to the scanning line 3 operate, and a predetermined voltage is written in the pixel electrodes 6 from the signal lines 4. The written voltage is held until a scan pulse voltage is supplied to this scanning line 3. Consequently, an electric field corresponding to the held voltage is generated between each pixel electrode 6 and the common electrode 12 (FIG. 1) and changes the alignment of liquid crystal molecules. This changes the amount of light transmitted through the first insulating substrate 1, the liquid crystal 10, and the second insulating substrate 2. The image is displayed by using this change in the light transmission state.

FIGS. 3A to 3E are sectional views showing steps of fabricating a thin film transistor used in the aforementioned conventional active matrix display in order of the steps. The thin film transistor shown in FIGS. 3A to 3E has an inverse stagger structure. As shown in FIG. 3E, an island semiconductor film 16 opposes a gate electrode 14 via a gate insulating film 15. A source electrode 19 and a drain electrode 18 are formed on this semiconductor film 16 via an ohmic contact layer 17.

The fabrication steps of this conventional thin film transistor will be described below with reference to FIGS. 3A to 3E. First, a first conductive film made of Al, Mo, or Cr is deposited on the entire surface of a transparent insulating film 13 such as glass by sputtering or the like. This first conductive film is coated with a photosensitive resist, and exposure, development, etching, and resist removal are performed by photolithography. Consequently, patterning of the first conductive film having a predetermined pattern of, e.g., a gate electrode 14 and a scanning line (not shown) is completed (FIG. 3A).

Subsequently, on the entire surface of the predetermined pattern of the first conductive film, a gate insulating film 15 made of $SiO_x$ or $SiN_x$, a semiconductor film 16 made of amorphous silicon (to be referred to as "a-Si" hereinafter), and an ohmic contact film 17 made of n-type a-Si or the like are successively formed in this order by sputtering or plasma CVD. After that, photolithography is performed to pattern the semiconductor film 16 and the ohmic contact film 17, forming a predetermined pattern serving as a transistor channel on the gate insulating film 15 above the gate electrode 14 (FIG. 3B).

Next, to electrically connect the first conductive film with a second conductive film for forming a source electrode, a drain electrode, a signal line, and the like by using, e.g., a scanning line input pad and a signal line input pad (neither is shown), the gate insulating film 15 is etched into a predetermined pattern by photolithography to form a hole (not shown) in the gate insulating film 15 above the first conductive film. A second conductive film made of, e.g., Al, Mo, or Cr is deposited on the entire surface by sputtering or the like. A signal line 4 (FIG. 2), a source electrode 19, and a drain electrode 18 are formed by photolithography (FIG. 3C). Additionally, a transparent conductive film made of ITO or the like is deposited on the entire surface, and a pixel electrode 6 is formed by photolithography. After that, etching is performed by using the source electrode 19 and the drain electrode 18 as masks to remove the n-type a-Si, i.e., the ohmic contact film 17 from the transistor channel (FIG. 3D). Finally, a protective film 20 made of $SiN_x$ or the like is deposited (FIG. 3E). Those portions of this protective film, which are on the pixel electrode 6 and the pad for receiving external signals are removed by photolithography, thereby completing the thin film transistor.

In the fabrication process of the thin film transistor array used in this conventional active matrix display, removal charging occurs when the insulating substrate is removed from a tray or the like of the film formation apparatus or the etching apparatus in each step, or the pattern of a conductive film is charged up in, e.g., the film formation step or the etching step. Especially in the insulating film or semiconductor film formation step and the dry etching step using plasma CVD, charging readily occurs because the substrate is exposed to plasma for long time periods. In addition to this charging, abnormal discharging during the film formation step using plasma CVD sometimes instantaneously applies very large electric charge to a certain specific signal line or scanning line.

In a situation like this, as shown in FIG. 2, if the scanning lines 3 or the signal lines 4 are not connected and electrically isolated from each other, it is more likely that the charge amount difference between adjacent scanning lines or signal lines or the electric charge applied to a certain specific scanning line or signal line by abnormal discharging becomes larger than the breakdown voltage of an insulating film. Consequently, a sudden current flows between the adjacent scanning lines or signal lines to cause a defect, e.g., break or short-circuit the lines or break the insulating film. Even if neither breaking of the lines nor a short circuit occurs, electric charge is injected into the gate insulating film in the transistor portion. This changes the transistor characteristics, e.g., shifts the threshold value, resulting in a point defect.

In particular, the pattern of lines such as scanning lines or signal lines initially formed on a transparent insulating substrate, such as scanning lines in this prior art, is subjected to a large number of film formation steps and dry etching steps before the formation of thin film transistors is completed. Additionally, the length and area of the pattern are large. This increases the charge amount by charge-up and increases defects such as breaking of lines and short circuits.

As a thin film transistor array for solving this problem, an active matrix display thin film transistor array in which all scanning lines and all signal lines are connected to common lines is known. FIG. 4 is a plan view showing an outline of the circuit configuration of this thin film transistor array. The thin film transistor array shown in FIG. 4 has the same structure as the inverse stagger thin film transistor shown in FIGS. 3A to 3E.

In the thin film transistor array shown in FIG. 4, scanning lines 3 and signal lines 4 are extracted via scanning line input pads 21 and signal line input pads 22 and connected to a scanning line common line 23 and a signal line common line 24, respectively. In this arrangement, all scanning lines and all signal lines are set at the same potential. Accordingly, even if very large electric charge is applied to a specific scanning line or signal line during the thin film transistor fabrication process, the charge is dispersed through the corresponding common line. This reduces any sudden current which may flow between adjacent scanning lines or signal lines. This also reduces the possibility of breaking of a specific line or a change in the characteristics of a specific thin film transistor.

In the thin film transistor array as described above, however, no images can be displayed if the scanning lines 3 and the signal lines 4 are kept connected. Therefore, at a certain point during the fabrication process it is necessary to disconnect the scanning lines 3 and the signal lines 4 from their common lines to separate these lines from each other. Accordingly, when the lines are separated in, e.g., the step of cutting out a liquid crystal display panel from the glass substrate, the possibility that defects occur increases if static electricity applies large electric charge to the scanning lines or signal lines in the subsequent steps. More specifically, in the active matrix display test step, a probe or the like of a display test apparatus is brought into contact with each scanning line input pad 21 and each signal line input pad 22. The respective predetermined electrical signals are applied to the scanning line 3 and the signal line 4 to allow the active matrix display to display an image, thereby checking whether there is a defect. If a potential difference is produced between the probe of the display test apparatus and the scanning line input pad 21 or the signal line input pad 22, electric charge is applied to the thin film transistor array through the scanning line input pad 21 or the signal line input pad 22. This breaks or short-circuits the lines or breaks the insulating film. Alternatively, electric charge is injected into the gate insulating film in a transistor portion. Consequently, the threshold value shifts, and a defect such as a point defect takes place. Additionally, in the step of, e.g., mounting an external driving circuit, similar defects occur if a potential difference is produced between the scanning line input pad 21 or the signal line input pad 22 and the apparatus in contact with the pad.

One technique for solving the above problems is the structure of an active matrix display thin film transistor array disclosed in Japanese Unexamined Patent Publication No. 63-220289. FIG. 5 is a plan view showing an outline of the circuit configuration of this thin film transistor array. FIG. 6 shows two-terminal thin film transistors connected to one scanning line in the circuit configuration shown in FIG. 5.

As shown in FIGS. 5 and 6, in the thin film transistor array disclosed in Japanese Unexamined Patent Publication No. 63-220289, each scanning line 3 is connected to a reference potential line 25 by two two-terminal thin film transistors 28 and 29 connected antiparallelly. Similarly, each signal line 4 is connected to the reference potential line 25 by two two-terminal thin film transistors 26 and 27 connected antiparallelly. A driving circuit applies electrical signals to the scanning lines 3 and the signal lines 4 to operate display thin film transistors 5 formed at the intersections of the scanning lines 3 and the signal lines 4, thereby displaying images. A terminal (not shown) applies the same potential as applied to a common electrode of the liquid crystal display to the reference potential line 25. When the potential of the reference potential line 25 is made equal to the potential applied to the common electrode as described above, the reference potential line 25 can also be used as a line for applying the potential to the common electrode.

FIG. 7 shows the voltage-current characteristic of the scanning line 3 and the reference potential line 25 when two such two-terminal thin film transistors are added. That is, if the scanning line 3 is positively or negatively charged with respect to the reference potential line 25 by static electricity or the like during the thin film transistor array fabrication process, a current flows in a direction in which this electric charge is canceled. That is, if the scanning line 3 is positively charged, a current flows in a direction in which this positive charge is let go to the reference potential line 25. If the scanning line 3 is negatively charged, a current flows in a direction in which this negative charge is let go to the reference potential line 25. This decreases the potential difference between the charged scanning line 3 and the reference potential line 25 and the potential difference between the charged scanning line 3 and an adjacent scanning line 3. Accordingly, it is possible to reduce defects such as breaking of the insulating film at the intersection between the charged scanning line 3 and the reference potential line 25, breaking of the charged scanning line 3, a short circuit between the charged scanning line 3 and the adjacent scanning line 3, and shift of the threshold value of the display thin film transistor 5 connected to the charged scanning line 3. This similarly holds true for the signal line 4.

Also, in the active matrix display test step or the step of mounting an external driving circuit, if a potential difference is produced between the probe or the apparatus and the scanning line input pad 21 or the signal line input pad 22 and electric charge is applied to the thin film transistor array, this electric charge goes to the reference potential line 25. Consequently, defects occurring after the display test step can be reduced. Furthermore, these two-terminal thin film transistors 26, 27, 28, and 29 are formed in the same steps as the display thin film transistors 5. Therefore, an active matrix display not having many defects resulting from static electricity can be formed without adding new fabrication steps.

Unfortunately, the thin film transistor array of the active matrix display as described above has the problem that even when the active matrix display for displaying images is normally driven, a current flows between the reference potential line 25 and the scanning lines 3 through the two-terminal thin film transistors to increase the consumption power of the liquid crystal display.

Generally, a current I(A) flowing through a two-terminal thin film transistor is represented by $$I=0 \text{ when } V<Vth,$$

or $$I=K(V-Vth)^2 \text{ when } V \geq Vth \qquad (1)$$

where

K is a constant (K=TC1W/2L),

V is (source (drain) electrode potential)−(gate electrode potential),

Vth is the threshold voltage of the two-terminal thin film transistor,

T is the field-effect mobility,

W is the transistor length,

L is the transistor width, and

C1 is the gate capacitance of the transistor.

Assume that in the above thin film transistor array, the voltage to be applied to the scanning line to turn on the display thin film transistor 5 is +20 V, the voltage to be applied to turn off the display thin film transistor 5 is −5 V, the voltage of the reference potential line 25 is the same voltage, +5 V, as applied to the common electrode, and Vth of the two-terminal thin film transistor is 2 V.

Assume also that this active matrix display is an SVGA panel (the number of signal lines=2,400, the number of scanning lines=600). When the display thin film transistor 5 connected to a certain scanning line 3 is ON, a voltage of +20 V is applied to this scanning line 3, and a voltage of −5 V is applied to the 599 remaining scanning lines. A current flowing between the scanning line 3 and the reference potential line 25 will be considered with reference to FIG. 6.

When a voltage of −5 V is applied to a certain scanning line 3, the two-terminal thin film transistor 28 is OFF, so no current flows. However, the two-terminal thin film transistor 29 is ON, so a current flows from the reference potential line 25 to the scanning line 3. This current I is I=(10−2)$^2$K=64K from equation (1). Accordingly, letting I$_{OFF}$ be the sum of currents flowing between the 599 scanning lines 3 and the reference potential line 25, hd OFF=599×64K=38,336K(A).

When a voltage of +20 V is applied to a certain scanning line 3, the two-terminal thin film transistor 29 is OFF, so no current flows. However, the two-terminal thin film transistor 28 is ON, so a current flows from the scanning line 3 to the reference potential line 25. Letting I$_{ON}$ be this current, I$_{ON}$=(15−2)$^2$K=169K from equation (1). Since I$_{OFF}$>>I$_{ON}$, the current flowing between the scanning line 3 and the reference potential line 25 can be regarded as nearly I$_{OFF}$. As described above, the thin film transistor array structure shown in FIG. 5 has the problem that the consumption power increases when the active matrix display is driven.

SUMMARY OF THE INVENTION

The present invention has been made in consideration of the aforementioned conventional problems and has its object to provide an active matrix display in which surge protecting circuits for reducing defects resulting from static electricity are formed around a thin film transistor array and the consumption power when the active matrix display is driven can be reduced by decreasing the value of current flowing between scanning lines and a reference potential line.

To achieve the above object, according to the principal aspect of the present invention, there is provided an active matrix liquid crystal display having a thin film transistor array which comprises scanning lines and signal lines formed in a matrix on a transparent insulating substrate, pixel electrodes formed in regions surrounded by the scanning lines and signal lines, and display thin film transistors formed close to intersections between the scanning lines and signal lines, and in which drain electrodes, source electrodes, and gate electrodes of the display thin film transistors are connected to the signal lines, pixel electrodes, and scanning lines, respectively, characterized by comprising, around an image region of the thin film transistor array, a scanning line reference potential line formed perpendicularly to the scanning lines, surge protecting circuits for connecting the scanning lines with the scanning line reference potential line, a signal line reference potential line formed perpendicularly to the signal lines, and surge protecting circuits for connecting the signal lines with the signal line reference potential line, wherein when a surge voltage is applied to the scanning line or signal line, electric charge is let go to the scanning line reference potential line or signal line reference potential line, respectively.

With this arrangement, even if static electricity or the like applies large electric charge to the scanning line or the signal line, a current flows through the two-terminal thin film transistors in a direction in which this voltage is canceled, so the electric charge can be let go. Therefore, it is possible to prevent defects caused by static electricity or the like, such as dielectric breakdown or breaking of lines at the intersection between the charged scanning line and the scanning line reference potential line or the signal line, a short circuit between adjacent scanning lines or adjacent signal lines, and shift of the threshold value of a transistor.

In the above active matrix liquid crystal display, arbitrary reference potentials can be applied to the scanning line reference potential line and the signal line reference potential line. This allows given potentials to be selected as potentials for turning on and off the surge protecting circuit or the like. Consequently, an increase in the consumption power arising from the formation of the surge protecting circuits can be reduced, and preferred reference potentials can be applied.

Additionally, each surge protecting circuit comprises two two-terminal thin film transistors. Accordingly, these surge protecting circuits can be formed simultaneously with the formation of the display thin film transistors in the process of fabricating the active matrix liquid crystal display thin film transistor array. Consequently, an increase in the number of fabrication steps caused by the formation of the surge protecting circuits can be decreased.

The gate set voltage when the display thin film transistor is OFF is applied to the scanning line reference potential line. Hence, it is possible to reduce the consumption power of the active matrix liquid crystal display and avoid the set voltage from being complicated.

Similarly, the same voltage as to be applied to the common electrode of the active matrix liquid crystal display is applied to the signal line reference potential line. This allows the signal line reference potential line to be also used as a line for applying the potential to the common electrode. Additionally, the set voltage can be avoided from being complicated.

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF THE PREFERRED EMBODIMENT

A preferred embodiment of the present invention will be described below with reference to the accompanying drawings (FIGS. 8 to 11).

Figure 8:
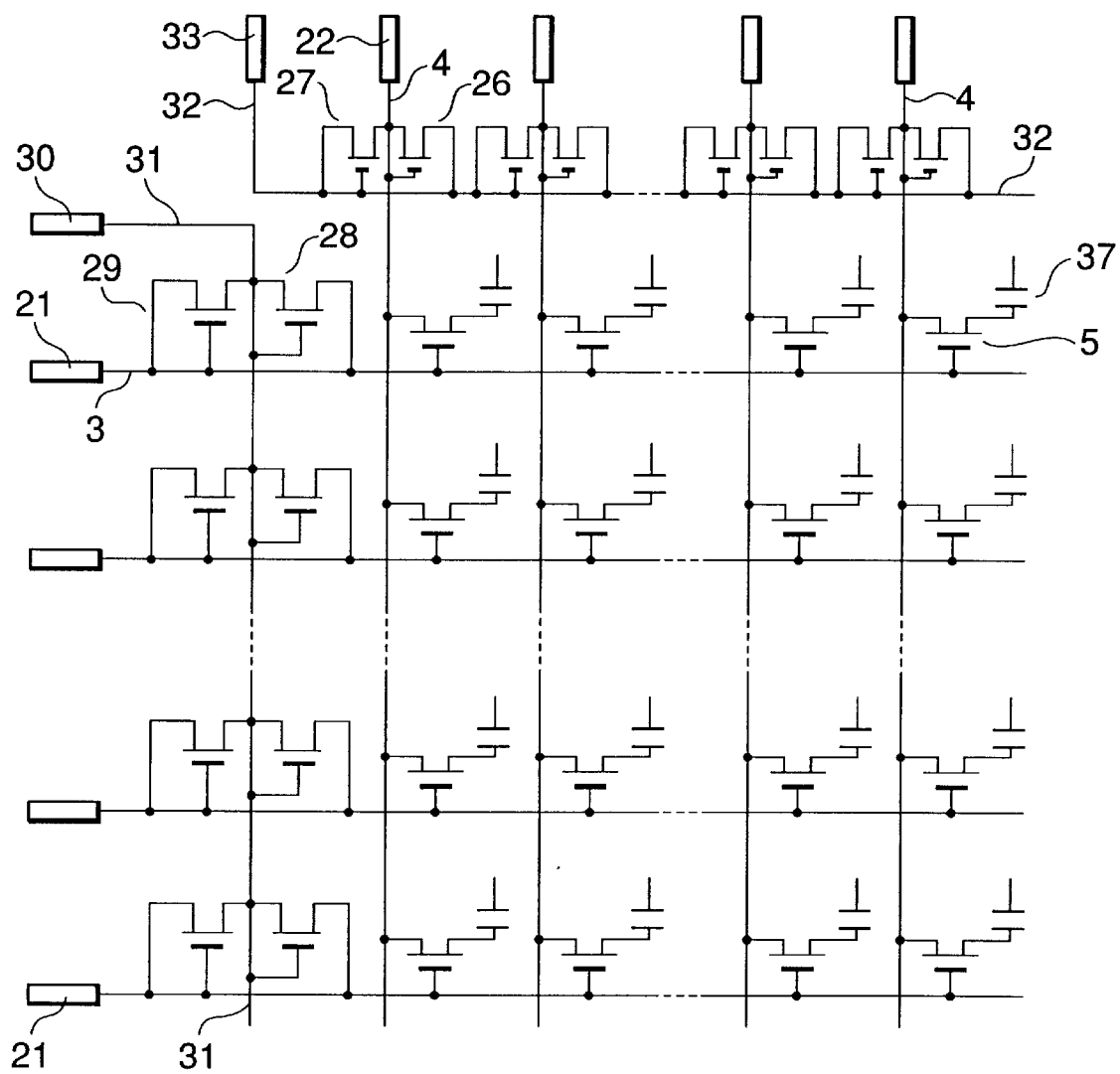
FIG. 8 is a wiring diagram showing an outline of the circuit configuration of an active matrix display thin film transistor array according to an embodiment of the present invention.

FIG. 8 is a view showing an outline of the circuit configuration of a thin film transistor array of an active matrix display according to an embodiment of the present invention.

Figure 1:
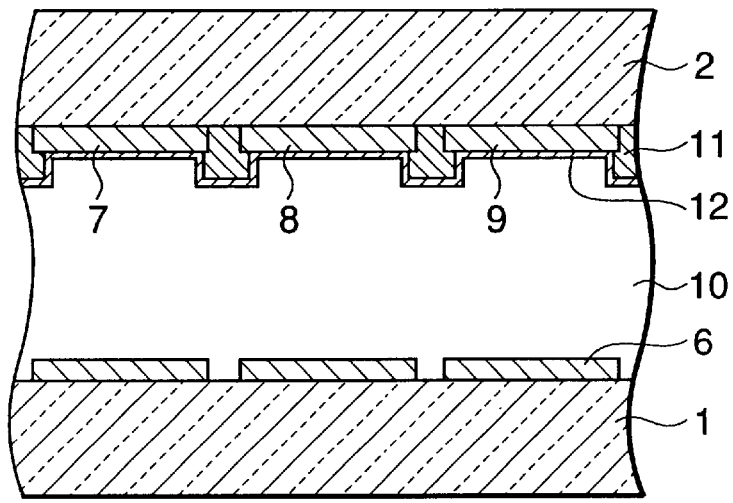
FIG. 1 is a sectional view of an active matrix display according to the first prior art.
Figure 2:
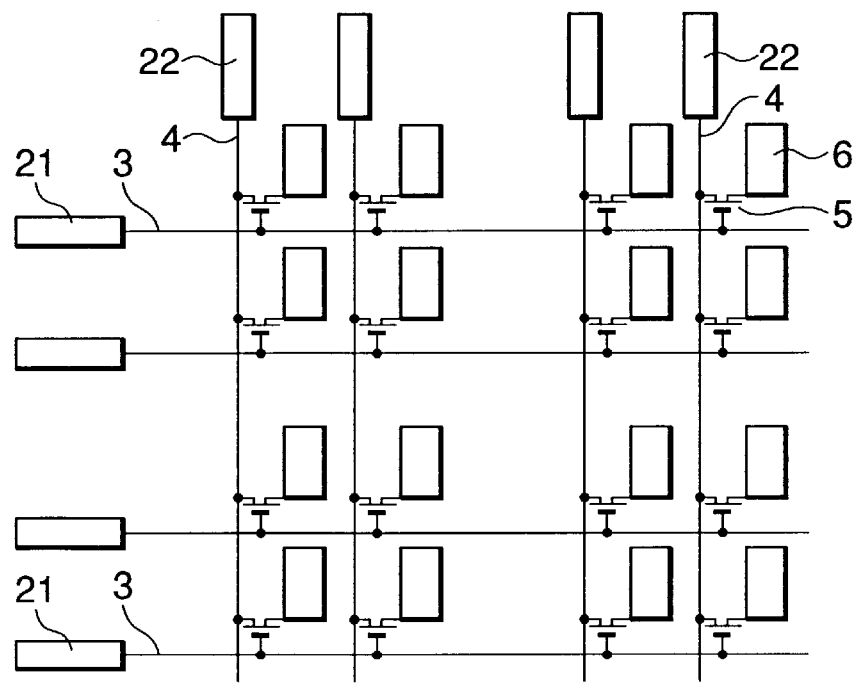
FIG. 2 is a wiring diagram showing an outline of the circuit configuration of a thin film transistor array for the active matrix display shown in FIG. 1.
Figure 3A:
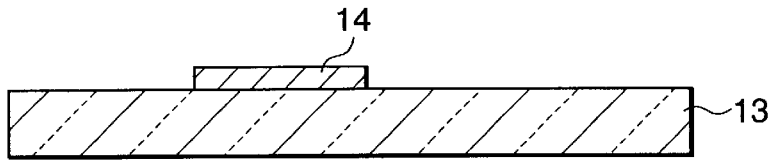
FIGS. 3A to 3E are sectional views showing steps of fabricating a thin film transistor used in the conventional active matrix display thin film transistor array in order of the steps.
Figure 3B:
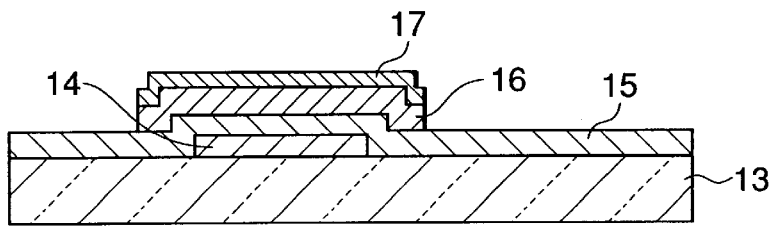
Figure 3C:
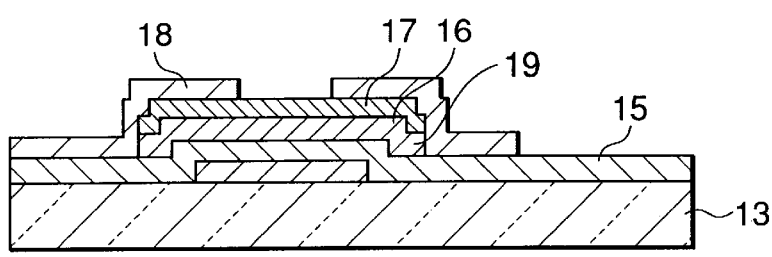
Figure 3D:
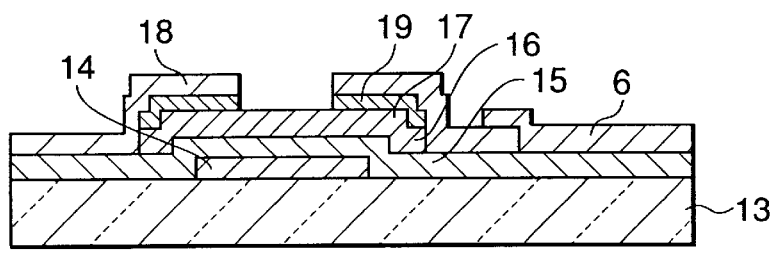
Figure 3E:
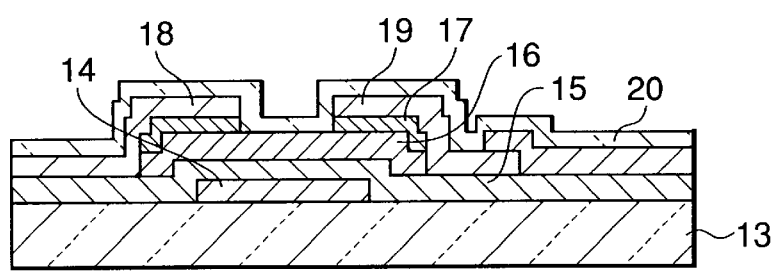
Figure 4:
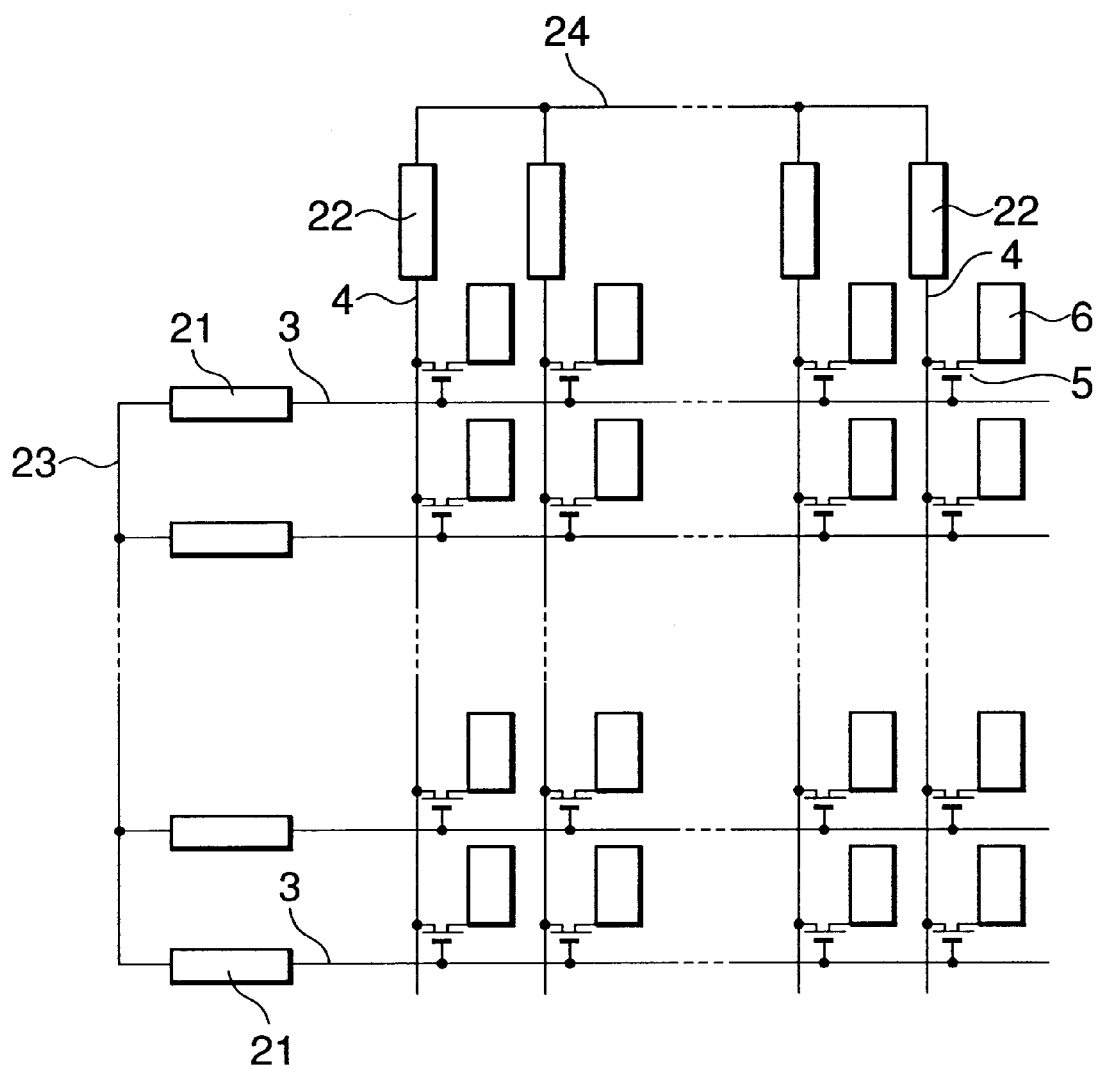
FIG. 4 is a wiring diagram showing an outline of the circuit configuration of an active matrix display thin film transistor array according to the second prior art.
Figure 5:
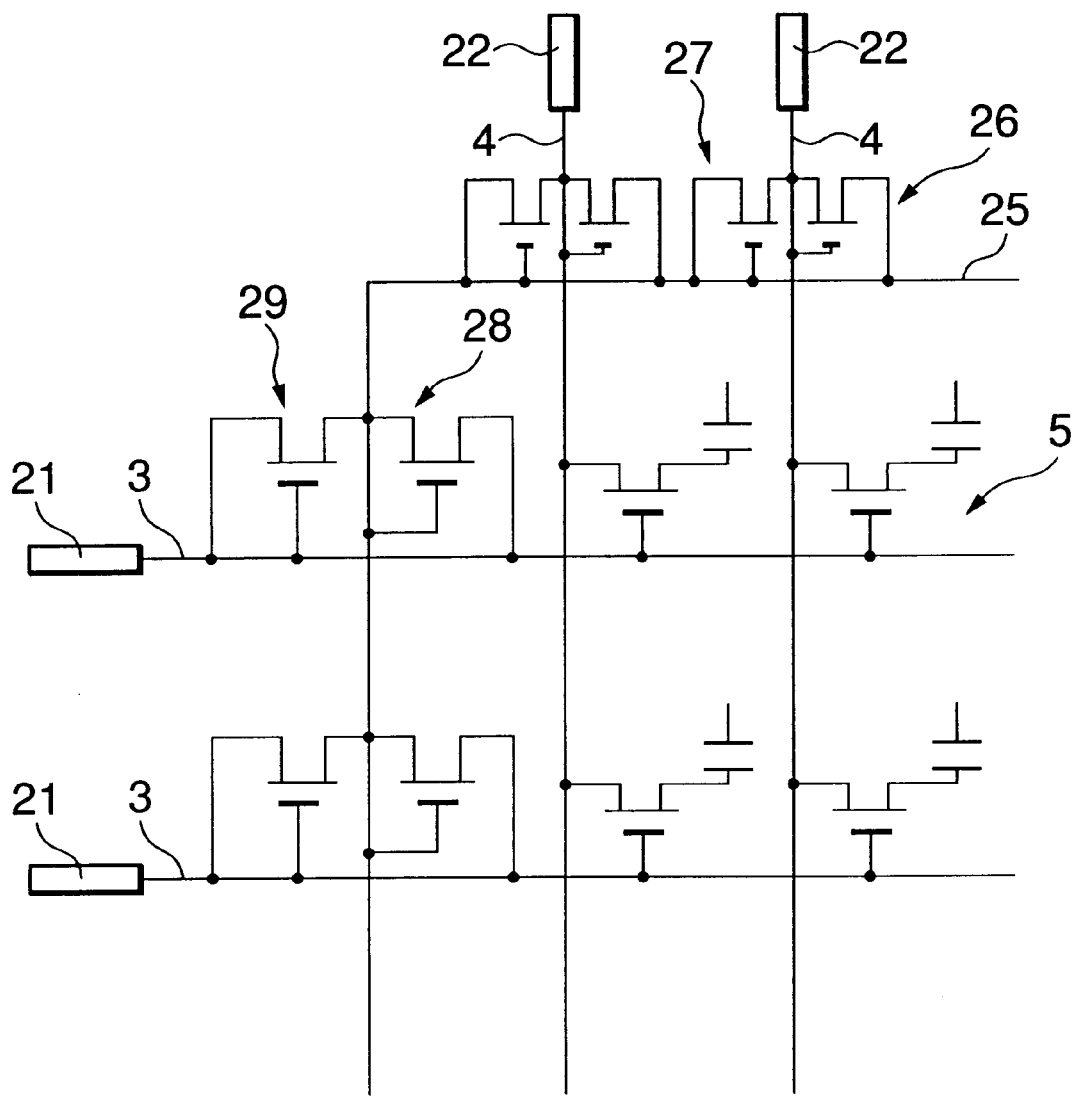
FIG. 5 is a wiring diagram showing an outline of the circuit configuration of a thin film transistor array disclosed in Japanese Unexamined Patent Publication No. 63-220298.
Figure 6:
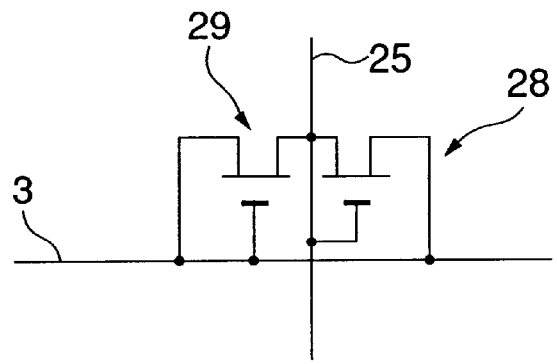
FIG. 6 is a circuit diagram of two-terminal thin film transistors added to one scanning line in the thin film transistor array shown in FIG. 5.

In the thin film transistor array according to the embodiment of the present invention as shown in FIG. 8, scanning lines 3 and signal lines 4 are formed in the row and column directions, respectively, on a transparent insulating substrate. Display thin film transistors 5 are formed at the intersections of these scanning lines and signal lines. The gate electrode, drain electrode, and source electrode of each display thin film transistor 5 are connected to the scanning line 3, the signal line 4, and a pixel electrode (FIG. 1), respectively. The pixel electrode connected to the source electrode of the display thin film transistor 5 and an opposing substrate (a first insulating substrate 1 shown in FIG. 1) form a capacitor 37 by using a liquid crystal as a dielectric substance.

Around the image region of this thin film transistor array, each scanning line 3 is connected to a scanning line reference potential line 31 by two two-terminal thin film transistors 28 and 29 connected antiparallelly. Similarly, each signal line 4 is connected to a signal line reference potential line 32 by two two-terminal thin film transistors 26 and 27 connected antiparallelly. That is, as shown in FIG. 8, the gate electrode of one two-terminal thin film transistor 28 or 29 added to each scanning line 3 is connected to the scanning line 3. The gate electrode of the other two-terminal thin film transistor 28 or 29 is connected to the scanning line reference potential line 31. Analogously, the gate electrode of one two-terminal thin film transistor 26 or 27 added to each signal line 4 is connected to the signal line 4. The gate electrode of the other two-terminal thin film transistor 26 or 27 is connected to the signal line reference potential line 32.

The scanning line reference potential line 31 is connected to a scanning line reference potential line input pad 30. An arbitrary reference voltage can be applied to this scanning line reference potential line input pad 30 from a driving circuit (not shown). Similarly, the signal line reference potential line 32 is connected to a signal line reference potential line input pad 33. An arbitrary reference voltage can be applied to this signal line reference potential line input pad 33 from a driving circuit (not shown).

The display operation of this thin film transistor array will be described below. A scan pulse voltage for sequentially turning on the display thin film transistors 5 is supplied to scanning line input pads 21 of the scanning lines 3. In synchronism with this scan pulse, a signal voltage corresponding to an image to be displayed is supplied to signal line input pads 22 of the signal lines 4. Consequently, the display thin film transistors 5 connected to the scanning lines 3 operate to write a predetermined voltage from the signal lines 4 into the pixel electrodes to charge and discharge the capacitors 37. Accordingly, the image signal voltage is applied to the capacitors 37, i.e., the liquid crystal layers, thereby displaying the image.

Figure 7:
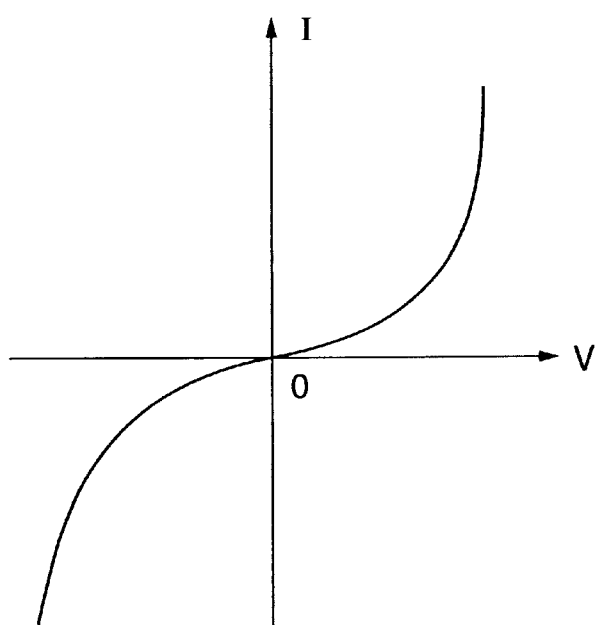
FIG. 7 is a graph showing the voltage-current characteristic of a scanning line and a reference potential line when the two-terminal thin film transistors shown in FIG. 5 are added.

Next, the voltage-current characteristic between the scanning line 3 and the scanning line reference potential line 31 and the voltage-current characteristic between the signal line 4 and the signal line reference potential line 32 when the four two-terminal thin film transistors 26 to 29 are added will be described below. These voltage-current characteristics are similar to that shown in FIG. 7. That is, when the scanning line 3 is positively or negatively charged with respect to the scanning line reference potential line 31, a current flows in a direction in which this electric charge is canceled. More specifically, when the scanning line 3 is positively charged, a current flows in a direction in which this positive electric charge is let go to the scanning line reference potential line 31. When the scanning line 3 is negatively charged, a current flows in a direction in which this negative electric charge is let go to the scanning line reference potential line 31. Accordingly, even if static electricity or the like applies large electric charge to the scanning line 3, it is possible to decrease any potential difference between the charged scanning line 3 and the scanning line reference potential line 31 and the potential difference between the charged scanning line 3 and an adjacent scanning line 3. Consequently, it is possible to reduce defects such as breaking of the insulating film at the intersection between the charged scanning line 3 and the scanning line reference potential line 31, breaking of the charged scanning line 3, a short circuit between the charged scanning line 3 and the adjacent scanning line 3, and shift of the threshold value of the display thin film transistor 5 connected to the charged scanning line 3. The same effect can be obtained for the signal lines 4.

Steps of fabricating the thin film transistor array according to the embodiment of the present invention will be described below. The order of thin film transistor fabrication steps is basically the same as that shown in FIGS. 3A to 3E provided that the thin film transistor structure is the same.

First, a first conductive film is deposited on the entire surface of a transparent insulating substrate such as glass by sputtering or the like. This first conductive film is coated with a photosensitive resist, and photolithography is performed to pattern the first conductive film having a predetermined pattern including the gate electrodes of the display thin film transistors 5 and the two-terminal thin film transistors 26, 27, 28, and 19, the scanning lines 3, and the signal line reference potential line 32. Subsequently, on the entire surface of the predetermined pattern of the first conductive film, a gate insulating film made of, e.g., $SiO_x$ or $SiN_x$, a semiconductor film made of, e.g., amorphous silicon (to be referred to as "a-Si" hereinafter), and an ohmic contact film made of, e.g., n-type a-Si are deposited in this order by CVD or the like. After that, the n-type a-si and the a-Si are patterned by photolithography to form a predetermined pattern serving as channels of transistors on the insulating film above the gate electrodes.

Next, to electrically connect the first conductive film with a second conductive film for forming source electrodes, drain electrodes, the signal lines 4, and the like by using, e.g., the scanning lines 3 and the signal line input pads 21, the gate insulating film is etched into a predetermined pattern by photolithography to form holes in the gate insulating film above the first conductive film. Subsequently, the second conductive film is deposited on the entire surface by sputtering or the like, and the signal lines 4, source electrodes, drain electrodes, and scanning line reference potential line 31 are formed by photolithography. Additionally, a transparent conductive film such as ITO is deposited on the entire surface, and pixel electrodes are formed by photolithography. After that, etching is performed by using the source and drain electrodes as masks to remove the n-type a-Si from the transistor channels. A protective film made of, e.g., $SiN_x$ is then deposited on the entire surface. Those portions of this protective film, which are on the pixel electrodes and pads for receiving external signals are removed by photolithography, thereby completing the process.

As is evident from the fabrication process described above, in the thin film transistor array according to this embodiment of the present invention, the scanning line reference potential line 31 can be formed simultaneously with the formation of the scanning lines 3, and the scanning line reference potential line 31 can be formed simultaneously with the formation of the signal lines 4. Also, the two-terminal thin film transistors 26, 27, 28, and 29 can be formed simultaneously with the formation of the display thin film transistors 5. Accordingly, the thin film transistor array according to the embodiment of the present invention can be fabricated by substantially the same number of steps as the fabrication steps of conventional thin film transistor arrays.

Figure 9:
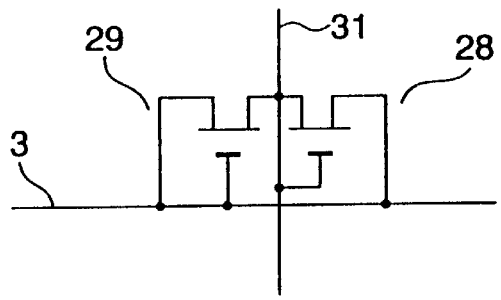
FIG. 9 is a circuit diagram of two-terminal thin film transistors added to one scanning line in the thin film transistor array shown in FIG. 8.
Figure 10:
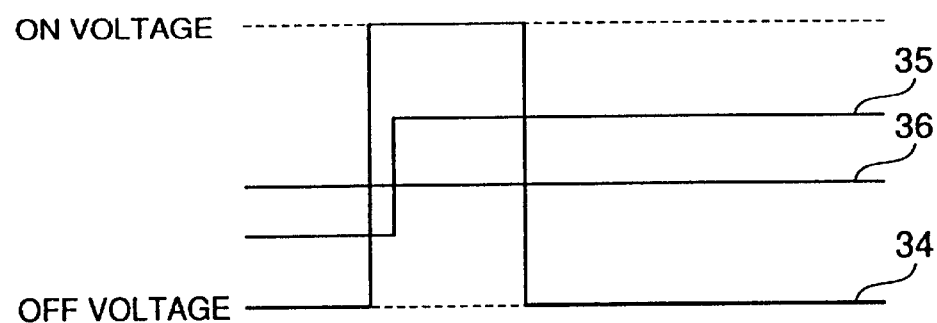
FIG. 10 is a view showing the scan voltage, the signal line voltage, and the common electrode voltage when a general active matrix display driving method is used.

A current flowing between the scanning line reference potential line 31 and the scanning line 3 through the two-terminal thin film transistors 28 and 29 when a normal image display operation is performed in an active matrix display obtained by adding a predetermined driving circuit (not shown) to the thin film transistor array according to the embodiment of the present invention will be described below with reference to FIGS. 9 and 10 showing the first driving method.

FIG. 9 shows the two-terminal thin film transistors connected to one scanning line in the circuit configuration shown in FIG. 8. FIG. 10 shows a scanning line voltage 34 applied to the scanning line 3 connected to a certain display thin film transistor 5 (FIG. 8), a signal line voltage 35 applied to the signal line 4, and a common electrode voltage 36 applied to the common electrode (FIG. 1) when a general driving method of displaying images on an active matrix display is used.

As shown in FIG. 10, the scanning line voltage 34 for turning on the display thin film transistor 5 is applied to the scanning line 3 on a fixed cycle for a predetermined time. For the rest of the time, the scanning line voltage 34 for turning off the display thin film transistor 5 is applied. Also, in substantially synchronism with the ON period of the display thin film transistor 5, a predetermined signal line voltage 35 corresponding to an image to be displayed is applied to the signal line 4. Consequently, the display thin film transistor 5 operates, and a current flows from the signal line 3 to the pixel electrode (FIG. 1) to set the pixel electrode at a predetermined voltage. The resulting potential difference between the pixel electrode and the common electrode yields predetermined transmittance. After the pixel electrode is set at the predetermined voltage, the display thin film transistor 5 is turned off. The predetermined voltage is held until the voltage for turning on the display thin film transistor 5 is next applied to the scanning line 3.

In this embodiment of the present invention, a given voltage can be applied to the scanning line reference potential line 31 from the scanning line reference potential line input pad 30. Also, a given voltage can be applied to the signal line reference potential line 32 from the signal line reference potential line input pad 33. Preferred values of potentials to be applied to these two reference potential lines will be considered below.

Generally, the signal line voltage 35 has a particular amplitude to supply a predetermined potential corresponding to a target image to the display thin film transistor. A potential near the center of this amplitude is the potential to be applied to the common electrode, i.e., the common electrode voltage 36 shown in FIG. 10. It is also considered preferable to apply a potential near the center amplitude of the signal line voltage 35 to the signal line reference potential line 32, because the leakage current flowing between the signal line reference potential line 32 and the signal line 4 is minimized. The operation is complicated if a potential different from the potentials to be applied to the scanning line 3, the signal line 4, and the common electrode is specially set and applied to the signal line reference potential line 32. To avoid this, it is preferable to apply the same potential as the common electrode voltage 36. Furthermore, when the same potential as the common electrode voltage 36 is applied to the signal line reference potential line 32, the signal line reference potential line 32 can also be used as a line for applying the potential to the common electrode.

On the other hand, as the potential to be applied to the scanning line reference potential line 31, a potential (OFF voltage of the scanning line voltage 34 in FIG. 10) which turns off the display thin film transistor 5 is considered most preferable to reduce the consumption power of the liquid crystal display. It is of course also preferable to avoid complicated operation of specially setting a potential different from the potentials applied to the scanning line 3, the signal line 4, and the common electrode.

Assume that the scanning line voltage 34 to be applied to the scanning line to turn on the display thin film transistor 5 is +20 V, the scanning line voltage 34 to be applied to turn off the display thin film transistor 5 is –5 V, the voltage to be applied to the scanning line reference potential line 31 is the same voltage, –5 V, as to be applied to turn off the display thin film transistor 5, and Vth of the two-terminal thin film transistors 28 and 29 is 2 V. Assume also that this active matrix display is an SVGA panel (the number of signal lines=2,400, the number of scanning lines=600). When the scanning line voltage 34 is applied to one scanning line 3 and the display thin film transistor 5 connected to this scanning line 3 is turned on, a voltage of +20 V is applied to the scanning line 3, and a voltage of –5 V is applied to the 599 remaining scanning lines.

A current flowing between the scanning line 3 and the scanning line reference potential line 31 will be considered with reference to FIG. 9. When a voltage of –5 V is applied to a certain scanning line 3, both of the two two-terminal thin film transistors 28 and 29 are OFF, so no current flows. When a voltage of +20 V is applied to a certain scanning line 3, the two-terminal thin film transistor 29 is OFF, so no current flows. However, the two-terminal thin film transistor 28 is ON, so a current flows from the scanning line 3 to the scanning line reference potential line 31. Letting $I_{ON}$ be this current, $I_{ON}=(25-2)^2K=529K(A)$ from equation (1) presented earlier. Accordingly, the current flowing between the scanning line 3 and the scanning line reference potential line 31 can be reduced to about 1.4% of 38,336K(A) in the prior art described previously.

Figure 11:
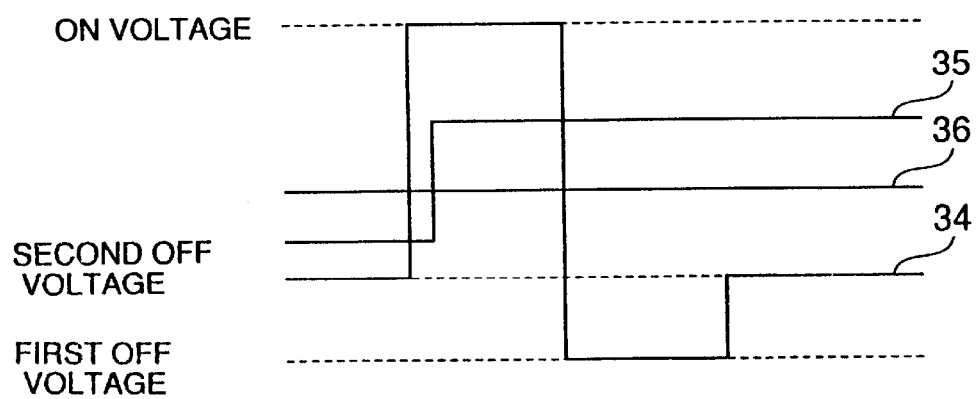
FIG. 11 is a view showing the scan voltage, the signal line voltage, and the common electrode voltage when another general active matrix display driving method is used.

A current flowing between the scanning line reference potential line 31 and the scanning line 3 through the two-terminal thin film transistors 28 and 29 when the active matrix display is driven by the second driving method different from the driving method shown in FIG. 10 will be described below with reference to FIGS. 9 and 11. FIG. 11 shows a scanning line voltage 34 applied to the scanning line 3 connected to a certain display thin film transistor 5 (FIG. 8), a signal line voltage 35 applied to the signal line 4, and a common electrode voltage 36 applied to the common electrode (FIG. 1) when a general driving method of displaying images on an active matrix display, which is different from the method shown in FIG. 10, is used.

As shown in FIG. 11, the scanning line voltage 34 for turning on the display thin film transistor 5 is applied from a driving circuit (not shown) or the like to the scanning line 3 on a fixed cycle for a predetermined time. For the rest of the time, the scanning line voltage 34 for turning off the display thin film transistor 5 is applied. Two voltages are set as this OFF voltage. One is a first OFF voltage to be applied immediately after the ON state for substantially the same time as the ON voltage application time. The other is a second OFF voltage to be applied after the first OFF voltage until the next ON voltage is applied. This second OFF voltage is higher by a few V than the voltage applied immediately after the ON state. Furthermore in substantially synchronism with the ON period of the display thin film transistor 5, a predetermined signal line voltage 35 corresponding to an image to be displayed is applied to the signal line 4. Consequently, the display thin film transistor 5 operates, and a current flows from the signal line 3 to the pixel electrode to set the pixel electrode at a predetermined voltage. The resulting potential difference between the pixel electrode and the common electrode yields predetermined transmittance. After the pixel electrode is set at the predetermined voltage, the display thin film transistor 5 is turned off. The predetermined voltage is held until the voltage for turning on the display thin film transistor 5 is next applied to the scanning line 3.

Assume that the scanning line voltage 34 to be applied to the scanning line to turn on the display thin film transistor 5 is +20 V, the first OFF voltage is –10 V, the second OFF voltage is –5 V, the voltage to be applied to the scanning line reference potential line 31 is –5 V, and Vth of the two-terminal thin film transistors 28 and 29 is 2 V. Assume also that this active matrix display is an SVGA panel (the number of signal lines=2,400, the number of scanning lines=600). If this is the case, a current of 529K(A) flows between the scanning line 3 and the scanning line reference potential line 31 from equation (1) presented earlier. Accordingly, the current flowing between the scanning line 3 and the scanning line reference potential line 31 can be reduced to about 1.4% of 38,336K(A) in the prior art described previously.

In the active matrix display according to the embodiment of the present invention as is apparent from the above description, even if static electricity or the like applies a very large voltage to the scanning line 3 or the signal line 4, a current flows through the two-terminal thin film transistors in a direction in which this voltage is canceled, so the electric charge can be let go. Hence, it is possible to reduce defects such as dielectric breakdown or breaking of lines at the intersection between the scanning line and the scanning line reference potential line 31 or the signal line 4, a short circuit, and shift of the threshold value of a transistor. Additionally, since an arbitrary potential can be applied to the scanning line reference potential line 31, a current flowing between the scanning line 3 and the scanning line reference potential line 31 can be decreased in a normal driving state. Consequently, an active matrix display with reduced consumption power can be provided.

The present invention is characterized in that a scanning line reference potential line perpendicular to scanning lines and a signal line reference potential line perpendicular to signal lines are formed around an image region of a liquid crystal display thin film transistor array, and protecting circuits are formed between each scanning line and the scanning line reference potential line and between each signal line and the signal line reference potential line. This protecting circuit is formed by using elements which allow positive or negative electric charge, which is applied as surge to the scanning line or the signal line, to flow to the corresponding reference potential line. Although two two-terminal thin film transistors are used to form this surge protecting circuit in the above embodiment, the present invention is not limited to this embodiment. Also, even when two-terminal thin film transistors are used, the transistor structure is not restricted to that shown in the embodiment.

The other characteristic feature of the present invention is that given reference potentials can be applied to the scanning line reference potential line and the signal line reference potential line. Accordingly, it is possible to select potentials for turning on and off the surge protecting circuit formed in the thin film transistor array. Since preferred reference potentials to be applied can be chosen, an increase in the consumption power resulting from the formation of the surge protecting circuits can be reduced when the liquid crystal display is normally driven. The reference potentials to be selected are determined on the basis of, e.g., the scanning line voltage, signal line voltage, and common electrode voltage of the liquid crystal display and the elements used in the protecting circuits. So, the reference potentials are not limited to the values described in the embodiment.

What is claimed is:

1. A method of driving a thin film transistor array in an active matrix liquid crystal display, said active matrix crystal display having scanning lines and signal lines formed in a matrix on a transparent insulating substrate, pixel electrodes formed in regions surrounded by said scanning lines and signal lines, display thin film transistors formed close to intersections between said scanning lines and said signal lines, wherein drain electrodes, source electrodes, and gate electrodes of said display thin film transistors are connected to said signal lines, said pixel electrodes, and said scanning lines, respectively, a scanning line reference potential line formed perpendicularly to said scanning lines, said scanning line reference potential line being adapted to have a first potential applied thereto, surge protecting circuits for connecting said scanning lines with said scanning line reference potential line, a signal line reference potential line formed perpendicularly to said signal lines, said signal line reference potential line being adapted to have a second potential applied thereto, and surge protecting circuits for connecting said signal lines with said signal line reference potential line, said method comprising the steps of:

applying an ON voltage, for turning on said display thin film transistor, to said scanning line on a fixed cycle for a predetermined time;

applying an OFF voltage, for turning off said display thin film transistor, for the rest of the time; and applying a predetermined signal line voltage, corresponding to an image to be displayed and having a potential difference from a common electrode voltage, to said signal line substantially in synchronism with the ON period of said display thin film transistor, wherein the OFF voltage applied to said scanning line includes a first OFF voltage, applied nearly immediately after an ON state of said display thin film transistor, and a second OFF voltage set to be higher than the first OFF voltage, and a duration of time of application of the first OFF voltage is substantially the same as the duration of predetermined time of application of the ON voltage for turning on said display thin film transistor.

* * * * *

UNITED STATES PATENT AND TRADEMARK OFFICE
CERTIFICATE OF CORRECTION

PATENT NO. : 6,304,305 B1  Page 1 of 1
DATED : October 16, 2001
INVENTOR(S) : Seiichi Matsumoto and Susumu Ohi It is certified that error appears in the above-identified patent and that said Letters Patent is hereby corrected as shown below:

Column 5,
Line 60, delete "hd OFF" insert -- $I_{OFF}$ --

Column 7,
Line 33, delete "63-220298" insert -- 63-220289 --

Signed and Sealed this

Thirtieth Day of April, 2002

Attest:

JAMES E. ROGAN
Attesting Officer  Director of the United States Patent and Trademark Office